United States Patent [19]

Wood

[11] 4,098,534
[45] Jul. 4, 1978

[54] BLISTER AIR DEFLECTOR

[76] Inventor: William J. Wood, 106-3735 Sheppard Ave. East, Agincourt, Ontario, Canada, M1T 3L1

[21] Appl. No.: 736,998

[22] Filed: Oct. 29, 1976

[51] Int. Cl.² .............................................. B62D 35/00
[52] U.S. Cl. ...................................................... 296/1 S
[58] Field of Search .................. 296/1 S, 91; 105/2 R

[56] References Cited

U.S. PATENT DOCUMENTS

| 2,514,695 | 7/1950 | Dempsey | 296/1 S |
|---|---|---|---|
| 3,425,740 | 2/1969 | De Vaughn | 296/1 S |
| 3,945,677 | 3/1976 | Servais | 105/2 R |
| 3,971,586 | 7/1976 | Saunders | 296/1 S |
| 3,999,796 | 12/1976 | Greene et al. | 296/1 S |
| 4,021,069 | 5/1970 | Hersh | 296/1 S |

OTHER PUBLICATIONS

The Cone of Economy, Mechanix Illustrated, Sep. 1976, p. 104.

Primary Examiner—John A. Pekar

[57] ABSTRACT

An improved blister type air deflector for a large box type trailer provides a stabilizing air stream around the top and sides of the trailer and also a region of high pressure in the space between the tractor and the trailer whereby salt, snow and ice pick up from road spray is minimized. The air deflector may be illuminated from within and serve as a signboard.

11 Claims, 7 Drawing Figures

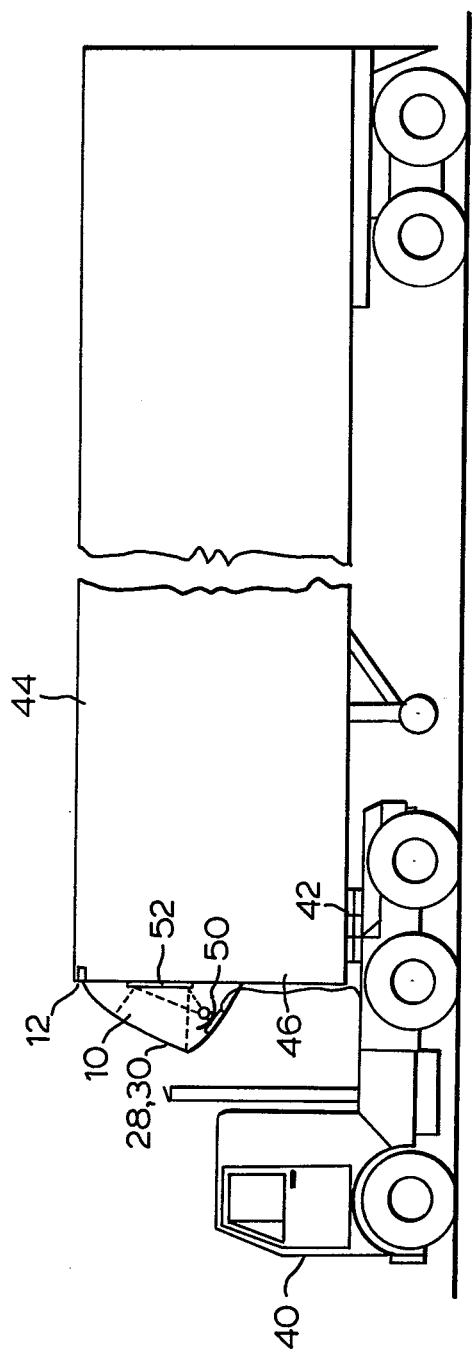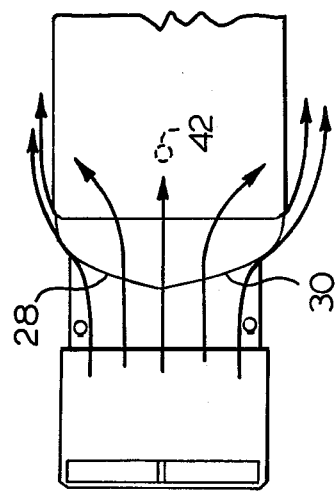

BLISTER AIR DEFLECTOR

This invention is related to an improved air deflector for tractor-trailers. It particularly relates to such deflectors as used for attachment to the front wall of van trailers.

The prior art is replete with air deflecting devices for attachment to either the tractor or the trailer of a tractor-trailer combination so as to improve their performance by reducing the air flow resistance. In many of the devices the traditional air flow patterns have been radically altered, and it is found that considerable quantities of air may be educted from beneath the tractor by upwardly directed air streams. The educted air may carry appreciable quantities of salt spray, snow and ice when the trailer is operated in a winter environment, resulting in corrosion of the electrical connectors located in this area, and the packing of ice between the tractor and trailer.

Certain of the trailer mounted air deflectors of the prior art are known to comprise a downwardly directed surface which will deflect air between the tractor and the front surface of the trailer. Such prior art deflectors may overcome the above problem, but generally this is at the expense of increasing the efficiency that they ostensibly promote. Additionally such prior art deflectors may reduce the manouverability of articulated tractors by limiting the turning radius of the tractor.

My invention has its primary object the provision of an improved air deflector for mounting on the front wall of a trailer, whereby the eduction of air and road spray into the space between the tractor and trailer is minimized, but without sacrifice of reduction in wind resistance, and without limiting the normal manouverability of the tractor-trailer.

My invention has for another object the provision of an air deflector of the aforementioned type with integral flange means for mounting the air deflector without requiring any means for mounting the air deflector without requiring any special reinforcement.

My invention has for a further object the provision of an air deflector of the aforementioned type wherein at least a portion of the front facing surface thereof is transulcent or transparent, and which may be illuminated from within for sign or display purposes.

The primary object of my invention is fulfilled by providing an air deflector having a generally rectangular plan-form area. A major convex surface of the deflector is divergent downwardly from the upper edge of the plan-form. A minor surface area is upwardly divergent from the lower edge of the plan-form. The minor surface comprises two portions which join in a leading apex and which incline therefrom towards the side edges respectively. The minor surface area intersects the major surface area abruptly to define the leading edge of the air deflector.

The remaining objects and other advantages of my invention will be further explained with reference to a preferred embodiment thereof as shown in the accompanying drawings wherein:

FIG. 5 shows the air deflector of FIG. 1 fitted to a trailer of a tractor-trailer combination in side elevation.

FIGS. 6 and 7 show in schematic form the air flow patterns generated when the combination of FIG. 5 is in forward motion.

Figure 1:
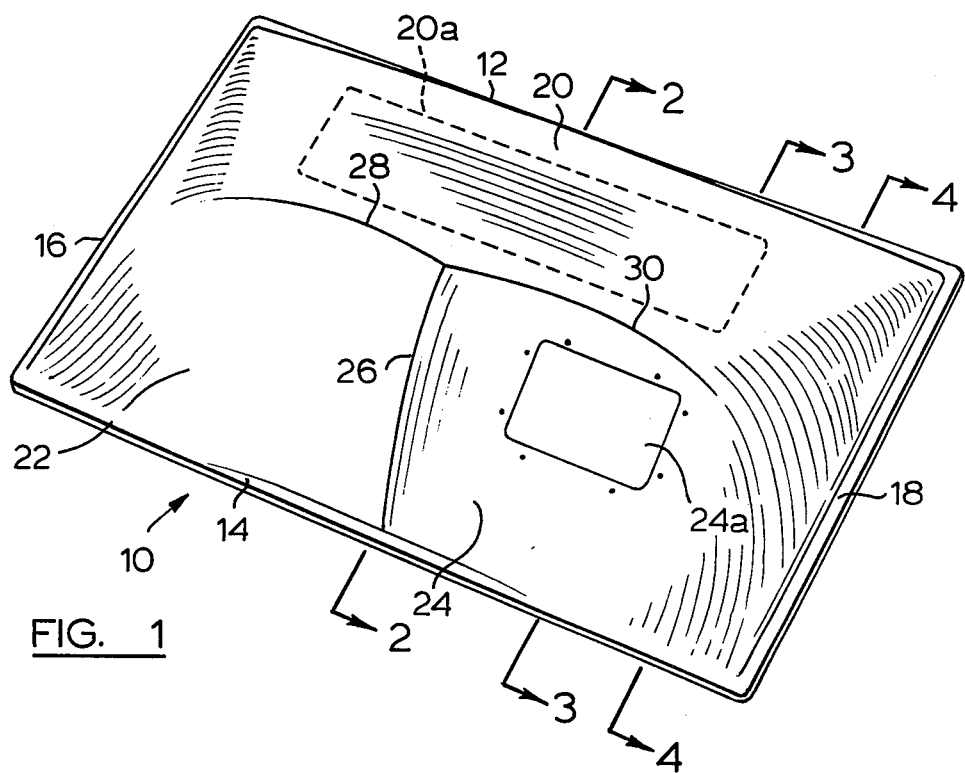
FIG. 1 is a fronted perspective view of the air deflector.

Referring to the Figures in detail, the air deflector of my invention is indicated generally by the numeral 10; the deflector has a generally rectangular plan-form area bounded by horizontal edges 12, 14 and vertical edges 16, 18. The deflector 10 includes a major convex surface 20 downwardly divergent from edge 12, and a minor surface comprising first and second portions 22, 24 upwardly divergent from edge 14. The minor surface portions 22, 24 join in an apex 26 and diverge gently therefrom respectively towards edges 16, 18. The minor surface portions 22, 24 intersect major surface 20 abruptly in a leading edge having two branches 28, 30. The sharpness of leading edge 28, 30 will depend to some extent upon the exigencies of the process of manufacture of air deflector 10. Thus where the deflector is fabricated from a fibreglass reinforced curable polyester the leading edge may be acuminated, but when the deflector 10 is fabricated from a sheet thermoplastic such as polycarbonate or polymethylmethacrylate by sagging or vacuum forming, for example, the leading edge will have a small radius. Of course other fabricating means and other materials may be preferred according to circumstances.

Figure 2:
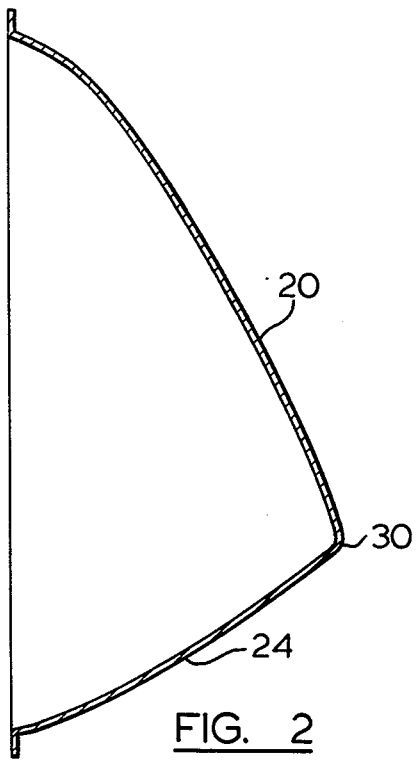
FIG. 2 is a sectional elevation along line 2—2 of FIG. 1.
Figure 3:
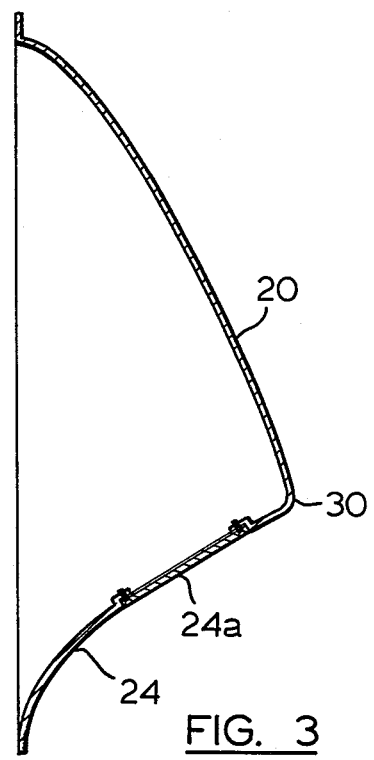
FIG. 3 is a sectional elevation along line 3—3 of FIG. 1.
Figure 4:
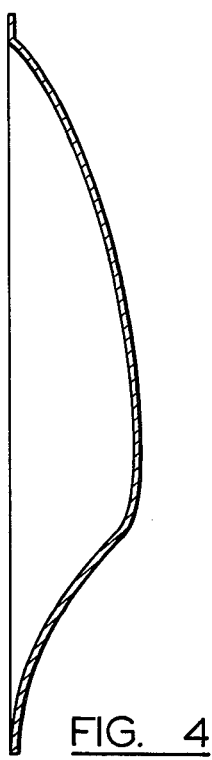
FIG. 4 is a sectional elevation along line 4—4 of FIG. 1.

Major surface 20 is relatively planar in a central area, as may be seen by a comparison of FIGS. 2 and 3. Upon approach to the side edges 16, 18 the concavity passes through a maximum, whilst always changing in a smooth contour. Minor surface portions 22, 24 have a compound curvature; adjacent the intersection of apex 26 and leading edge 28, 30 the curvature is slightly convex. On progressing along the diagonal towards the corners formed by edges 16 and 18 respectively the curvature becomes concave. Where the concave portions of the minor surface intersect major surface 20 the intersection will be less well defined than along portions of the leading edge 28, 30 adjacent apex 26. This may be seen from a comparison of sections shown in FIGS. 3 and 4.

Referring now to FIG. 5, a tractor 40 is shown in a conventional arrangement coupled by articulated joint 42 to a trailer 44. The roof of the trailer extends appreciably above the roof line of the tractor cab; additionally the back wall of the tractor cab is spaced forwardly from the front wall 46 of the trailer. Air deflector 10 is mounted on the front wall of the trailer with horizontal edge 12 of the air deflector adjacent the roof level of the trailer. The air deflector 10 is proportioned such that leading edge 28, 30 is slightly above the roof line of the cab of tractor 40.

Referring specifically to FIGS. 6 and 7, wherein the air flow patterns generated as the tractor-trailer combination 40, 44 with the air deflector 10 of my invention moves forwardly are depicted, it will be appreciated that the major proportion of the onrushing air flow encountered by the deflector will be directed upwardly by major surface 20 to stream along the roof of trailer 44. Secondary air flow streams will be directed along the longitudinal sides of trailer 44 by the steeply convex side portions of major surface 20 adjacent vertical edges 16, 18 of deflector 10. The primary and secondary air flows will together form a smooth envelope decreasing the wind resistance of trailer 44 and increasing its stability. The air flow will also include relatively small but important tertiary stream which is cleaved from the on rushing air with the minimum of turbulence where this air meets leading edge 28, 30 of the deflector 10. This tertiary air is directed downwardly by minor surface 22, 24 of deflector 10 so as to increase the air pressure in the space between the front surface 46 of the trailer 44 and the rear cab wall of tractor 40. Such increased pressure will reduce the tendency for spray from the road surface to be educted into this area, and will tend to minimize the deposition of salt and ice upon electrical connections in hostile climatic conditions. It should be observed that the divergent surfaces 22, 24 of the air deflector 10 will direct the majority of the tertiary air stream so that it will combine with the secondary air stream along the longitudinal walls of trailer 44.

It will also be apparent from a consideration of FIGS. 5, 6 and 7 that when installed in position on the front wall 46 of trailer 44, the air deflector 10 will not detract from the manouverability of the tractor 40, as this moves on articulated joint 42 with respect to the trailer. Thus, as seen best in FIG. 7, the leading edge 28, 30 of air deflector 10 approximates an arc of a circle having a centre on articulated joint 42. The limitation of the turning circle of tractor 40 due to interference particularly between the exhaust stacks 48 and certain prior art air deflectors has severely limited their applicability.

As previously mentioned, two suitable methods for the production of air deflector 10 are by forming from sheet thermoplastic material and by using a fibreglass reinforced curable polyester. Both of these methods enable the production of an air deflector 10 as a unipartite structure having an integral frame like flange along each of the edges 12 to 18. Such flange provides considerable rigidity to the blister-like structure whereby the walls may be relatively thin. In addition the flanges provide a convenient mounting means for mounting the air deflector onto the sheet metal front of trailer 44 without requiring any particular strengthening or reinforcing means.

It is preferred that at least a major proportion of major surface 20a of air deflector 10 be translucent or transparent. Thus it is contemplated to provide illuminating means 50 within the space enclosed by the air deflector so as to illuminate this surface portion such that signs or messages upon that portion may be clearly displayed. Desirably illuminating means 50 will be mounted on the inner surface of all portions 22, 24 such that light rays therefrom may be reflected from a reflector 52 on the front wall 46 of trailer 44 whereby a relatively large area of wall 20 may be illuminated uniformly.

In order to provide access to the interior of deflector 10 for the purpose of lamping or otherwise maintaining illuminating means 50, an access panel 24a is formed in wall portion 24, as shown in FIGS. 1 and 3. This may be formed from the same material as that from which the surrounding portions of the deflector 10 are constructed, and affixed thereto with screws or other detachable means. Where area 20a is formed of a different material more highly light transmissible than that of the surrounding portions of the air deflector, it may be integrally attached thereto as by cementing, or in the same manner as that in which access panel 24a is formed.

I claim:

1. In combination, a trailer for use in articulated coupling having a forwardly facing upstanding wall, a blister air deflector carried on said wall
   said deflector having a generally rectangular plan-form, and including upper, lower and vertical side edges, the upper edge of said plan-form being generally coincident with the upper margin of said wall, a convex major surface downwardly divergent from the upper edge of said plan-form,
   a minor surface upwardly convergent from the lower edge of said plan-form,
   said minor surface comprising two portions intersecting in a leading apex and diverging therefrom in a shallow V-shape towards the vertical side edges of said plan-form,
   said major surface intersecting said minor surface abruptly to define the leading edge of said air deflector.

2. The combination of claim 1 wherein the convexity of said major surface is at a maximum in areas adjoining the vertical side edges of said plan-form.

3. The combination of claim 1 wherein said minor surface has a concavity adjacent the lower edge of said plan-form.

4. The combination of claim 1 wherein said air deflector is unipartitely formed, and includes a flange means around the perimeter of said plan-form for mounting said deflector to said trailer.

5. The combination of claim 4 wherein said air deflector is formed from a transparent thermoplastic sheet material.

6. The air deflector combination of claim 4 when wherein said air deflector is formed from a curable polyester material reinforced with glass fibre.

7. The combination of claim 1 wherein said air deflector is rigid and includes at least a major portion of said major surface which is translucent or transparent.

8. The combination of claim 7 wherein illumination means is provided internally of said deflector.

9. The combination of claim 7 wherein sealable door access means is provided in at least one said surface of said air deflector.

10. The combination of claim 9 wherein a light reflector means is provided on said wall internally of said air deflector.

11. The combination of claim 9 wherein a light source is supported from an interior surface of said deflector.

* * * * *